INVENTOR
Jack Lemson and
Robert E. Trueb
BY
Stevens, Davis, Miller & Mosher
ATTORNEYS United States Patent Office 2,996,604
Patented Aug. 15, 1961

2,996,604
RESISTANCE-SENSITIVE WELDING
CONTROL SYSTEM
Jack Lemson and Robert E. Trueb, Dallas, Tex., assignors to Texas Instruments Incorporated, Dallas, Tex., a corporation of Delaware
Filed Oct. 29, 1958, Ser. No. 770,324
7 Claims. (Cl. 219—110)

This invention relates to projection welding, and more particularly to a resistance-sensitive system for controlling a projection welding operation employed in the manufacture of hermetically-sealed, metal-encased transistors.

Projection welding is a resistance-welding process in which coalesence of work parts is produced by the heat obtained from resistance to the flow of electric current through the work parts when held together under pressure by welding electrodes. The resulting welds are localized at predetermined points on the parts to be welded according to part design. Localization is usually accomplished by projections, embossments, or intersections, which direct the flow of welding current from one work part to the other. The metal at the projection is heated to a temperature suitable for welding by the resistance to the passage of current.

When projection welding techniques are used in the manufacture of hermetically-sealed, metal-encased transistors, several problems are encountered which hinder the large scale production of high quality transistors. The first problem involves the contact resistance between the welding electrodes and the base of the metal encasement for the transistor. As the welding operation is repeated during the successive sealing of a large number of transistors, the contact resistance between the welding electrodes and the metal encasement tends to increase under the influence of heat. This is due to the build-up of oxides on the surfaces of the welding electrodes which are in direct contact with the metal encasement. As the contact resistance between the electrodes and the metal encasement increases, the weld temperature tends to increase which, in turn, causes further oxidation. The results are cumulative, and in order to maintain high weld quality it is necessary to repeatedly clean and dress the surfaces of the welding electrodes.

A second problem involves the high contact resistance of the metal surfaces, resulting from the insulating fluids, greases, and powders used while treating the transistor bars prior to encasement. The contamination of the metal surfaces by these compounds is difficult to detect by visual inspection, and because of this is frequently not detected before the welding operation. As a result, the contact resistance of the metal surfaces may at times be sufficiently high to cause flash-over and severe burning of both the welding electrodes and the base metal.

It is a principal object of the present invention to solve the above problems and thus permit the large scale production of high quality transistors by providing a welding control system in which the application of electric welding current is prevented if a sufficiently high contact resistance is encountered, thereby preventing the welding operation from taking place.

It is a further object of the present invention to provide projection welding apparatus which will consistently yield welds of high quality, and at the same time will reduce abnormal electrode wear, thereby reducing both maintenance and production costs.

In accordance with the above objects, a welding control system is provided in which a current sensing circuit is used to determine the magnitude of the electrical resistance formed by the work to be welded and the welding electrodes. When the magnitude of this resistance, as measured by the current in the sensing circuit, is less than a pre-determined value, a bistable electronic switch is triggered. Relay means are provided to permit the flow of welding current (thus allowing welds to be formed) and to disconnect the current sensing circuit from the welding electrodes when the bistable electronic switch has been triggered. When the bistable electronic switch has not been triggered, which indicates that the welding resistance is greater than the pre-determined value, the relay means prevents the application of welding current to the welding electrodes (and hence does not allow a weld to be formed).

If the bistable electronic switch has not been triggered within a pre-selected time interval after the work to be welded has been placed between the welding electrodes, a gating relay will prevent operation of the bistable electronic switch. This limits the time for the welding resistance to drop below the pre-determined value. When the welding operation is allowed to proceed, a limit switch, which is triggered after the welding operation has been completed, resets the bistable electronic switch to its original state.

Other objects, advantages, and characteristic features of the present invention will become readily apparent upon consideration of the following detailed description of a preferred embodiment of the invention when taken in conjunction with the appended drawings in which.

Figure 1:
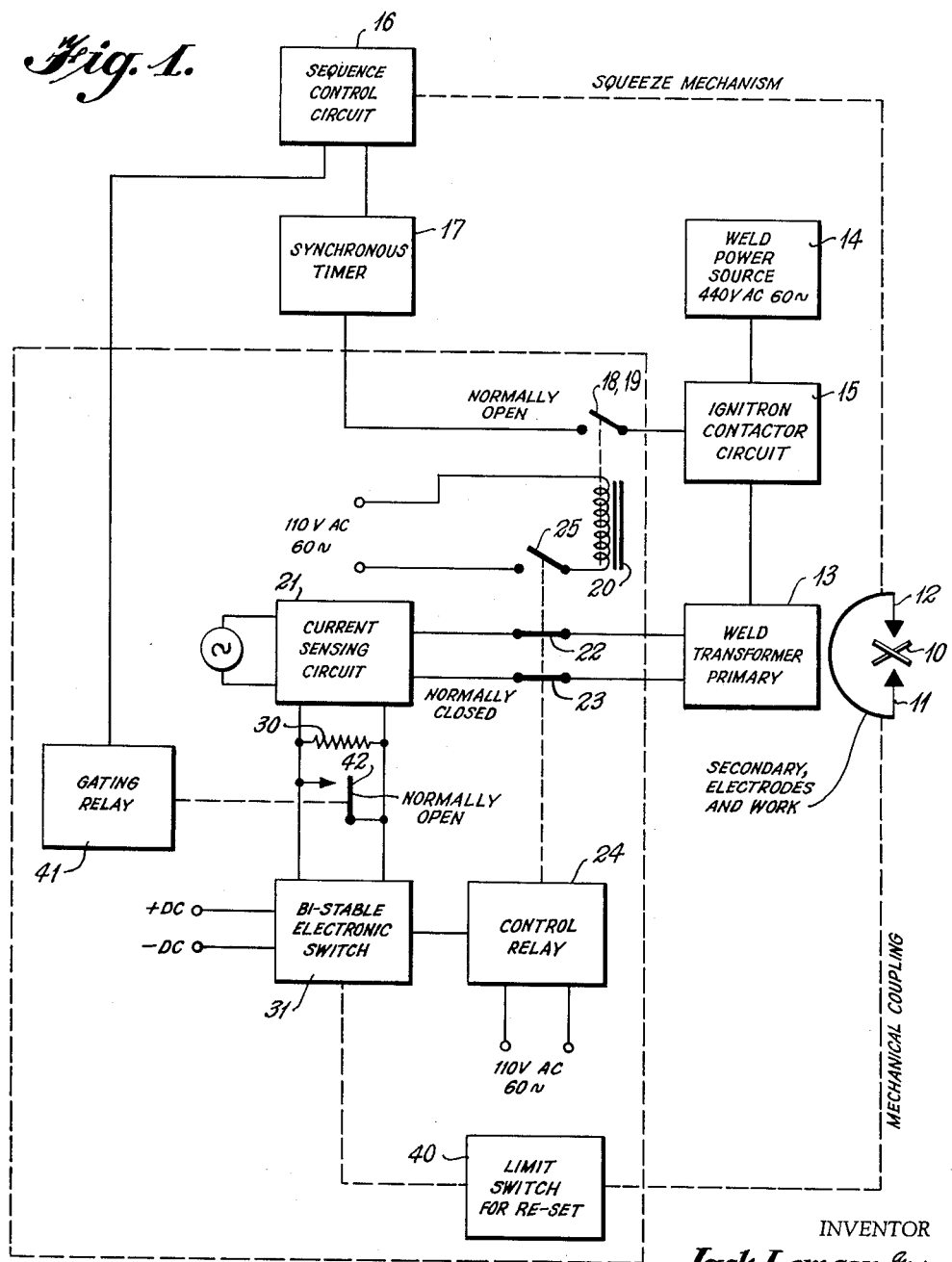
FIGURE 1 is a block diagram of the control system of the present invention.
Figure 2:
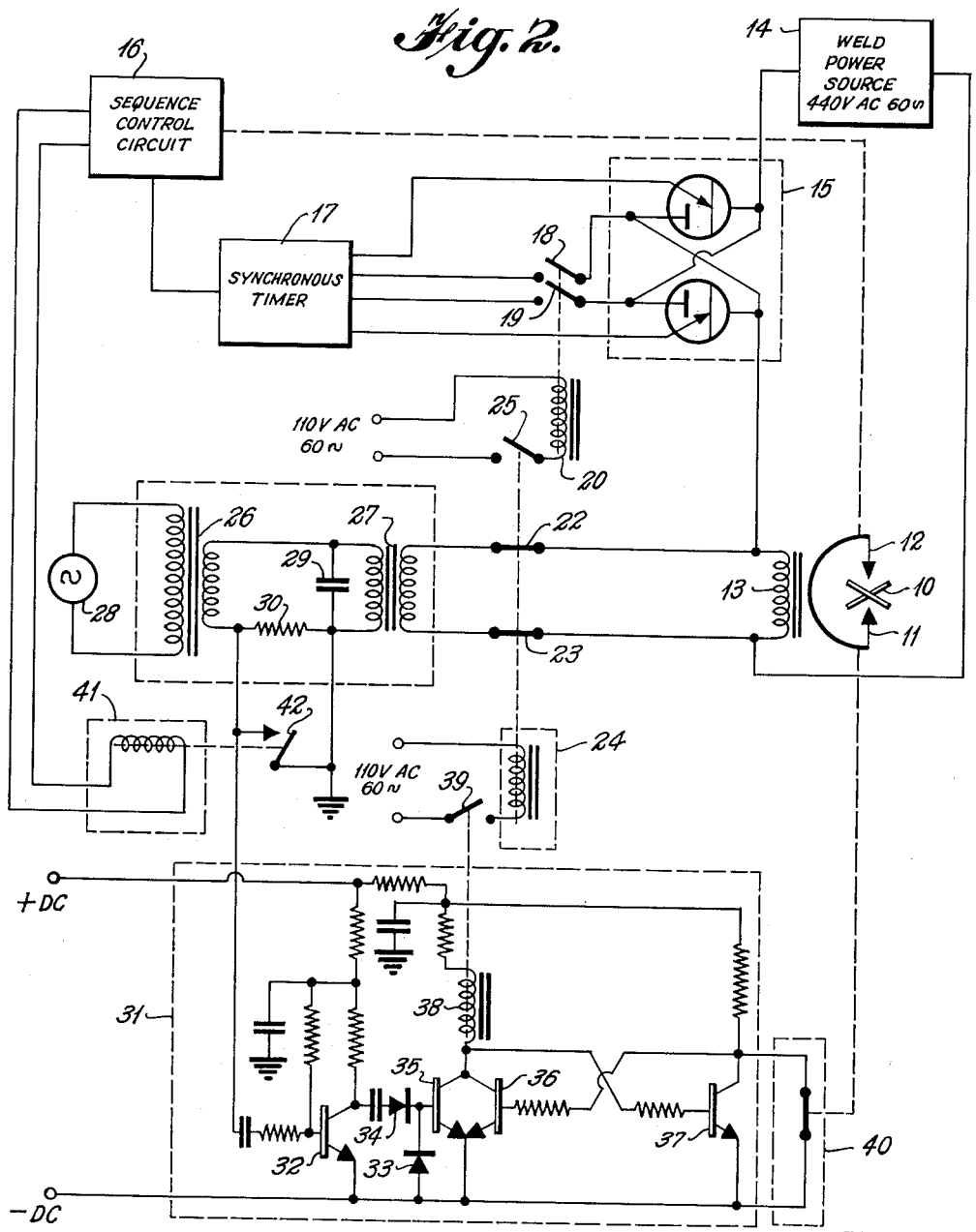
FIGURE 2 is a schematic circuit diagram of the system of the invention.

Referring now to the drawings, the work 10 to be welded is shown disposed between welding electrodes 11 and 12, which form the secondary of a welding transformer 13. Welding current is supplied by a 440 volt 60 cycle source 14, and is applied to the primary of transformer 13 by means of an ignitron contactor 15. The ignitron contactor 15 is driven by a sequence control circuit 16 and a synchronous timer 17, the timer 17 being connected to the ignitron contactor 15 by means of normally open contact arms 18 and 19 of a weld relay 20 energized by a 110 v. A.C. 60 cycle source.

In the welding control apparatus of the present invention, which serves to prevent the application of welding current when a sufficiently high contact resistance is encountered, a current sensing circuit designated generally by the numeral 21 is connected to the primary of weld transformer 13 through normally closed contact arms 22 and 23 of a control relay 24. Arm 25 of the control relay 24 is normally in the open position and is connected in the drive circuit of weld relay 20 to energize the relay 20 when the control relay 24 is energized.

The current sensing circuit 21 comprises an input transformer 26, the primary of which is connected across a 2 kc. voltage generator 28, and an output transformer 27, the secondary of which is connected by means of relay arms 22 and 23 to the primary of weld transformer 13. Transformer 27 isolates the primary of weld transformer 13 from the 2 kc. source 28. A capacitor 29 is connected across the primary of transformer 27, while a current sensing resistor 30 is connected in series with the primary of transformer 27 and the secondary of transformer 26. The capacitor 29 tunes the transformer 27 and its reflected load to give a high impedance when the secondary winding of weld transformer 13 is at open circuit conditions, i.e. when there is no work placed between the welding electrodes 11 and 12.

The current sensing resistor 30 is connected across the imput to a bistable electronic switch shown generally by the numeral 31. The bistable electronic switch 31 consists of an RC-coupled amplifier circuit primarily constructed around transistor 32. The input to the amplifier circuit is applied to the base of transistor 32, while the output is taken from the collector and is applied by means of a shunt diode 33 and a series diode 34 to the base of a triggering transistor 35.

The bistable element in the switch circuit 31 includes transistors 36 and 37, the emitter and collector of the transistor 36 being connected to the emitter and collector respectively of the triggering transistor 35. A relay 38 having a contact arm 39 normally in the open position is connected to the collector of transistor 36 and is used to control the relay 24. A limit switch 40 is connected to the transistor 37 and serves to reset the bistable circuit when the proper signal is received from the weld sequence control circuit 16. A gating relay 41, connected to the sequence control circuit 16, is adapted to move a relay arm 42 which is connected in parallel with the current sensing resistor 30.

In the operation of the control system, a sinusoidal 2 kc. low power voltage is applied to the primary winding of the welding transformer 13 through the current sensing circuit 21 and the normally closed contact arms 22 and 23 of the control relay 24. Contact arms 18 and 19 of the weld relay 20 are at this time open so that the synchronous timer 17 is disconnected from the ignitron contactor 16, thus preventing the flow of welding current in the welding transformer 13.

When there is no work disposed between the welding electrodes 11 and 12, the secondary of welding transformer 13 is at open circuit conditions, and the impedance as seen by the primary terminals of transformer 27 is high. The current flowing through the sensing resistor 30 is therefore low. As the welding electrodes 11 and 12 come into contact with the work 10, the impedance as seen by the primary terminals of the transformer 27 drops substantially, causing a corresponding increase in the current through resistor 30.

Prior to the initiation of the welding sequence, the limit switch 40 is closed, thus maintaining transistor 36 in a non-conducting state. As the weld sequence is initiated by the sequence control circuit, the switch 40 is opened. Since transistors 36 and 37 form a bistable circuit, transistor 36 will remain off and transistor 37 will conduct. As the clamp on transistor 37 has been removed, the states of transistors 36 and 37 will be interchanged upon the occurrence of a proper signal.

If the increase in current through sensing resistor 30 (resulting from the reduction in impedance when the work 10 is in contact with the electrodes 11 and 12) is great enough the bistable circuit will be triggered in the following manner. The signal from resistor 30 will be amplified by transistor 32 and rectified by diodes 33 and 34 before being applied to triggering transistor 35. When the emitter-collector current in transistor 35 is great enough, transistor 36 becomes conducting while transistor 37 is cut-off, thus reversing the state of the bistable switch. This occurs, of course, only if the resistance formed by the electrodes 11 and 12 and the work 10 to be welded is below a predetermined critical value.

When transistor 36 is caused to conduct as a result of the triggering signal, relay 38 is energized. Energization of relay 38 closes contact arm 39, thus energizing the control relay 24. When the control relay 24 is energized, the secondary winding of transformer 27 is disconnected from the primary of the weld transformer 13; and the weld relay 20 is energized (by closing of the contact arm 25) to connect the output of the synchronous timer 17 to the ignitron contactor 15. Thus, when the synchronous timer 17 receives a signal from the sequence control 16, a weld power timing signal is sent to the ignitron contactor 15, which routes welding current from the source 14 to the transformer primary 13. The welding current is applied without damage to the sensing circuit 21 because contact arms 22 and 23 of control relay 24 have disconnected the secondary of transformer 27 from the primary of weld transformer 13.

When the weld squeeze mechanism (controlled by the sequence control circuit 16) is restored to the off position as a result of the welding being completed, the limit switch 40 is closed. This resets the bistable circuit containing transistors 36 and 37 to its initial state wherein transistor 36 is cut-off while transistor 37 is conducting. A cycle of the welding operation is now completed, the following cycle being started when additional work 10 is placed between the welding electrodes 11 and 12.

The operation of the control system to prevent welding from taking place when the contact resistance is sufficiently high is as follows. A short time after the work 10 has been placed between the electrodes 11 and 12 but prior to the initiation of the weld timing signal from the synchronous timer 17, a signal from the sequence control circuit 16 is sent to the gating relay 41 to energize the relay and thus close contact arm 42. The closing of arm 42 short circuits the sensing resistor 30 and thereby prevents a triggering signal from being applied to the bistable switch 31. This serves to place a limitation on the time allowed for the weld resistance to drop below the predetermined value. If the bistable electronic switch 31 is not triggered during the allowed time interval, welding will not take place during the present sequence of operation, since the bistable electronic switch will remain in its initial state. Thus partial welds as well as other poor quality welds are prevented.

Although the present invention has been shown and described with reference to a particular preferred embodiment, nevertheless, various changes and modifications obvious to one skilled in the art are within the spirit, scope, and contemplation of the present invention. For example, it should be noted that aside from immediate practical considerations, relay 38 could be made to take over the functions of both the weld relay 20 and the control relay 24 without departing from the intended scope of the invention. Such a substitution, of course, would be merely a matter of choice and availability of components.

What we claim is:

1. In a welding control system including work-holding means to hold the elements to be welded in a position in which welding can be accomplished, an electric welding current supply means and means for applying the electric welding current to said work-holding means to perform the welding operation, the improvement comprising a sensing current supply means, means for sensing as a function of the sensing current the magnitude of the electrical resistance formed by the elements to be welded and said work-holding means, a bistable electronic switch triggered by said current sensing means, and means responsive to the state of said bistable electronic switch to connect said welding current supply means to said means for applying the welding current to said work-holding means if said electrical resistance is less than a predetermined value.

2. In a welding control system including work-holding means to hold the elements to be welded in a position in which welding can be accomplished and means for applying an electric welding current to said work-holding means to perform the welding operation, the improvement comprising current sensing means for determining the magnitude of the electrical resistance formed by the elements to be welded and said work-holding means, a bistable electronic switch triggered by said current sensing means, and means responsive to the state of said bistable electronic switch to prevent the application of welding current to said work-holding means if said electrical resistance is greater than a predetermined value and to disconnect said current sensing means from said work-holding means if said resistance is below said predetermined value.

3. A welding control system as set forth in claim 2 having means to reset said bistable electronic switch after the welding operation has been completed.

4. A welding control system as set forth in claim 2 having means for preventing said bistable electronic switch from being triggered after a pre-selected time after the elements to be welded have been placed in said position in which welding can be accomplished.

5. A welding control system as set forth in claim 4 having means to reset said bistable electronic switch after the welding operation has been completed.

6. In a welding control system, a plurality of welding electrodes, means for applying electric current to said welding electrodes after the resistance between the welding electrodes is reduced below a predetermined value, and means for preventing the application of said welding current if said welding current is not applied during a preselected period of time after the closing of said welding electrodes.

7. In a welding control system including a work holding means to hold the elements to be welded in a position in which welding can be accomplished, electric welding current supply means, and transformer means for applying the electric welding current to said work holding means to perform the welding operation, the improvement comprising a sensing current supply means, means to apply said sensing current to the primary of said welding transformer, means for sensing the magnitude of the current flowing in the primary of said weld transformer, a bistable electronic switch operable in response to a predetermined minimum sensing current flowing in the primary of said welding transformer to interrupt said sensing current to said primary and thereafter to actuate means for applying said welding current to said primary of said welding transformer.

References Cited in the file of this patent

UNITED STATES PATENTS

| | | |
|---|---|---|
| 1,933,936 | Schnetzer | Mar. 7, 1933 |
| 2,112,716 | Smith | Mar. 29, 1938 |